April 27, 1948. F. G. BALDWIN 2,440,569
PLANT POT COVER
Filed May 4, 1945
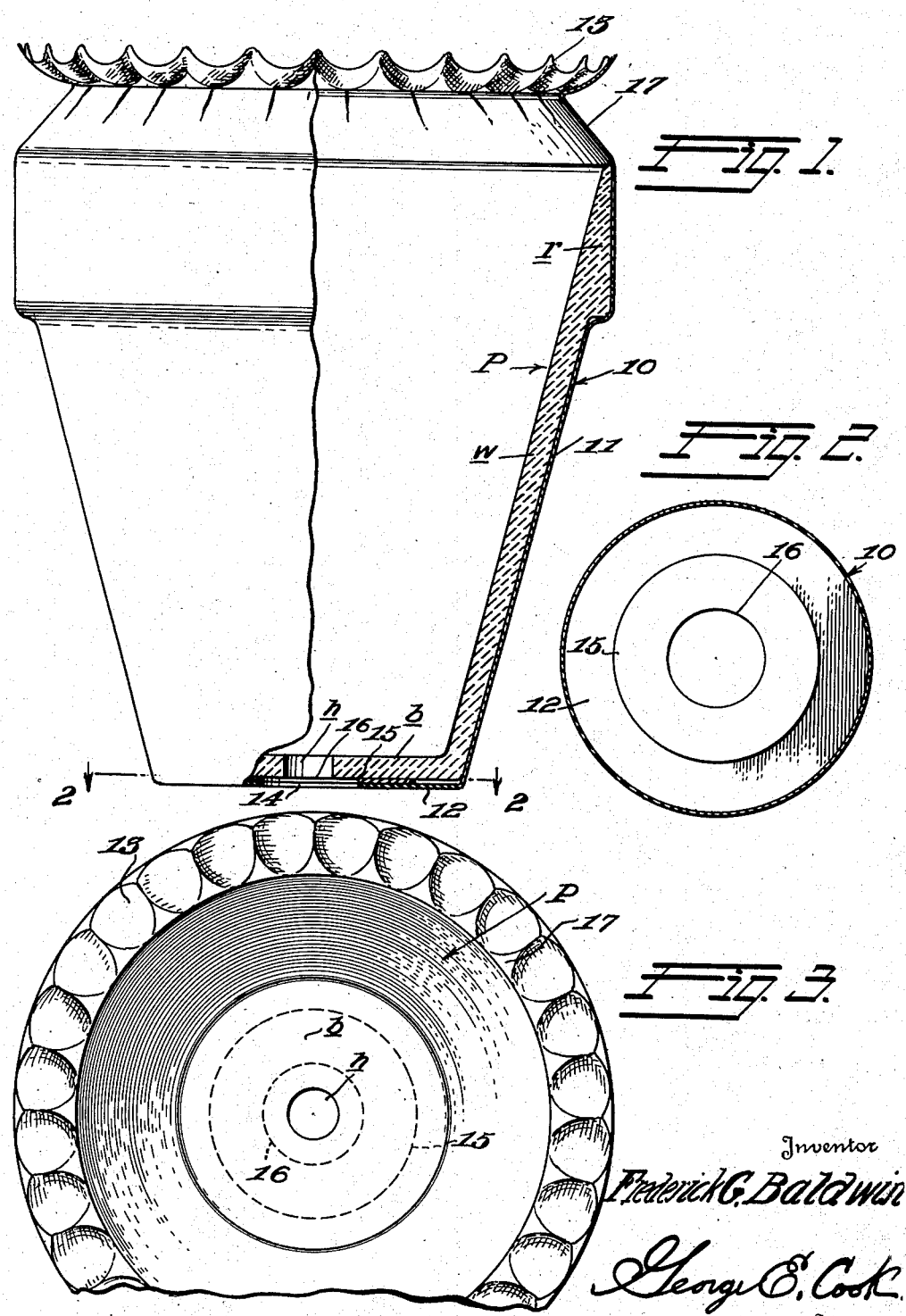
Inventor
Frederick G. Baldwin
George E. Cook
Attorney Patented Apr. 27, 1948

2,440,569

UNITED STATES PATENT OFFICE 2,440,569

PLANT POT COVER

Frederick G. Baldwin, Woodbridge, N. J.

Application May 4, 1945, Serial No. 591,886

2 Claims. (Cl. 41—10)

This invention relates to a plant pot cover and is a continuation in part of my prior application, Serial No. 238,685, filed November 3, 1938, now abandoned.

The invention more particularly relates to a cover or wrapper for the exterior of flower pots whereby same may be properly conditioned for transportation and for improving the appearance thereof.

As is generally known, flower or plant pots, especially those found in greenhouses and florist shops present a rather unsightly external appearance due to their relatively cheap construction, as well as to the fact that more or less soil accumulates thereon during potting and to the further fact that periodic watering of the plants also causes some soil as well as a green slime or fungus to form on the pot.

It is common practice to wrap flower pots with paper of different textures and colors for transportation by purchasers thereof, as well as to conceal the exteriors of the pots and thereby improve the appearance of the plants or flowers therein.

It has, however, been found difficult to wrap flower pots with paper and impart a neat appearance thereto and with the assurance that the wrappers will retain their position on the tapering or flaring walls of the pots. Furthermore, the pots are quite often wet due to the required constant sprinkling of the plants therein. Finally, when wrapped in a wet condition the paper wrappers absorb some of the moisture with the result that the wrappers are soiled and often tear and become loosened from the pots.

Furthermore, thousands of potted plants are purchased to be placed in hospitals, sick rooms and the like. These pots have bases which are rough and which tend to mar tables or other furniture upon which the pot may rest. The pot cover of the instant invention does away with this objectionable feature eliminating the danger of damaging or marring to articles of furniture or the like.

As previously indicated, potted plants must be watered at intervals. When, as heretofore been the practice, the pots are wrapped with paper, some water is quite apt to be spilled on the wrapper with the result that they became soiled and accordingly detracts from the general appearance of the potted plants, and in fact, the wrapper may entirely give way and reveal the unsightly pot.

A primary object of this invention, therefore, is the provision of a cover for plant pots which overcomes the objections above noted in the paper wrappers heretofore used.

A further object of the invention is the provision of a plant pot cover which is preformed; is capable of quick and accurate application to or removal from a pot; which is attractive in appearance; which will positively maintain its position on the pot as well as its appearance irrespective of any necessary treatment of the plant therein; and which will add longer life to the plant in that it inhibits the evaporation of moisture on the outer surface of the pot.

A further purpose of the invention is the formation of a pot cover which is waterproof; which will fit pots of different sizes; and which will accurately conform to the external shape of the pot whereby the contour thereof is maintained.

Yet a further aim of the invention is the construction of a plant pot cover which in applied position has an inwardly overhanging portion at the top of the pot; or alternatively an extension above the top of the pot which may stand erect or extend outwardly in flare-like shape; all for the purpose of conserving moisture in the soil whereby less frequent watering of a plant therein is required.

A still further object of the invention is the provision of a plant pot cover which is relatively inexpensive to manufacture and which is capable of being accurately applied to a pot in a minimum of time, thereby saving much time heretofore consumed in the rather laborious task of wrapping plant pots with paper.

For a more complete understanding of the nature and purposes of the invention, reference is had to the following detailed description, taken in conjunction with the accompanying drawing, wherein Figure 1 is a view partly in elevation and partly in central vertical section of a plant pot with the improved cover applied thereto.

Figure 2 is a horizontal section on a plane represented by line 2—2 of Figure 1.

Figure 3 is a broken top plan view of the structure shown in Figure 1.

Referring to the drawing by reference characters, and wherein like characters designate like parts in the different views, P represents a flower or plant pot which, as illustrated, is substantially of the contour of most plant pots now in use, the pot including a base $b$ having a central drain hole $h$, frusto-conical side wall $w$, and a relatively wide rim $r$ at the top thereof whose outer wall is substantially cylindrical.

The specific pot P is illustrated solely for the purpose of disclosing the use of the improved cover and it is to be understood that the cover is not confined in its use to pots of any particular external configuration but is adapted for use on pots of various external forms and sizes.

The improved cover, in a preferred embodiment thereof comprises a unitary member of sack-like form or alternatively a unitary member of sufficient rigidity to receive a pot dropped therein and be locked about the pot by virtue of the cover being smaller than the pot. Such a cover is represented by the reference character 10.

The cover 10 is preferably constructed of rubber latex, synthetic rubber, synthetic resins, vinyle chloride, vinyl acetate or similar materials, whereby it is stretchable and will accurately conform to the exteriors of pots of various sizes and designs, however, different sizes of the covers may be provided for pots of materially different sizes.

The cover 10 includes the upright wall 11, base 12 and ornamental top edge 13.

The base 12 is provided with a central opening 14 which may be of the diameter of the hole h or somewhat larger as illustrated.

The base 12 is preferably reinforced adjacent the opening 14 to avoid possible rupture of the material at the perimeter of the opening.

While this reinforcement may partake of various forms, it preferably comprises a disc 15 having a central opening 16 conforming to the opening 14 and the disc which also is preferably of rubber latex, synthetic rubber, or similar materials, is suitably adhered to the base 12 internally thereof.

The top edge 13 of the cover 10 is preferably of an ornamental formation to give an attractive appearance to the cover and such formation may comprise ruffles, or scallops, etc., the drawing illustrating in general an ornamental formation.

The cover 10 is of a length or height in excess of the height of the pot P, thus resulting in an extension 17 above the top of the pot when the cover is applied.

Due to the fact that the material of the cover 10 is tensioned by the wall w of the pot, the extension 17 will flare inwardly as the top edge 13 is not subjected to such tension. On the other hand, the extension 17 may be made erect or to project outwardly.

It will now be seen from the foregoing disclosure that the cover 10 is of relatively simple construction and is capable of production at relatively low cost.

Persons engaged in handling potted plants may have a quantity of the covers 10 in their possession and as each cover in collapsed or nonapplied position will occupy very little space, a large number thereof may be readily stored in a small space. When the cover is semi-rigid one cover may be inserted into another to form a stacked arrangement.

With the improved covers on hand, a potted plant dealer may readily cover or dress any desired number of pots by merely drawing the sack-like cover over the pot or in the case of the semi-rigid cover drop the pot into the cover and this is facilitated by the shape of the pots which have smaller ends at the bases rather than the tops thereof.

When a cover is applied to a pot, it is only necessary to draw upward on it until the base 12 thereof engages the base b of the pot whereupon the cover will be accurately engaged with the pot and as the wall 11 thereof is stretched or tensioned, the external line formation of the pot will be retained.

The covers are capable of application in a very short interval of time and regardless of how many pots are covered they will all present a uniform attractive appearance as the covers are uniformly and accurately positioned without any guess work or experimentation in the application thereof.

The bases b of the pots as well as the side wall w will be covered and the openings 14 and 16 will permit excess moisture to escape from the pots through their holes h.

The inwardly flared extensions 17 will function to retain the moisture within the pots thereby preserving the plants with less frequent watering thereof, and the ornamental top edge 13 will materially improve the general appearance of the potted plant as a whole.

The covers 10 may readily be applied to the pots of potted plants in a wet or muddy condition after which they may be carried without danger of soiling clothing or placed in rooms without danger of soiling any of the furniture or linens therein.

The covers may be of various colors, either solid or in combinations and may have printed thereon words or sayings appropriate to certain occasions such as "Christmas," "Easter," "Mother's Day," etc.

Furthermore, the rubber-latex, or synthetic rubber covers are very durable and will retain their form and appearance for an indefinite length of time and when applied as illustrated in Figure 1, they will grip the pots in such manner that they will positively retain their position thereon even under careless handling thereof.

While I have disclosed but a single specific embodiment of my invention, such is to be considered as illustrative only, and not restrictive, the scope of the invention being defined in the subjoined claims.

What I claim and desire to secure by U. S. Letters Patent is:

1. A cover for a plant pot including a centrally apertured bottom wall and an upwardly and outwardly flared side wall including an upper rim and the side wall being of predetermined diameters and of a predetermined height; said cover comprising a thin walled, flexible water-proof sack-like member having a bottom wall and a side engageable with the pot externally thereof with its bottom wall in engagement with the bottom wall of the pot, and said member being of greater length than the height of the pot side wall and the walls thereof being stretchable, the diameters of the side wall of the member being normally less than corresponding diameters of the pot side wall and the rim portion of the member projecting above the rim of the pot, whereby the major portion of the member side wall is stretched and conforms with the pot side wall while the rim portion is disposed above the pot rim in unstretched condition and within the circumference of the pot rim in overhanging relations to the interior of the pot in frusto-conical formation.

2. A plant pot cover according to claim 1 wherein the bottom wall thereof is provided with a perforation for alinement with the perforation in the bottom wall of the pot, and wherein said rim portion is provided with an ornamental formation, and a reinforcing disk member adhered to the inner surface of the cover bottom wall centrally thereof and provided with a perforation in alinement with said perforation in the bottom wall of the cover.

FRED. G. BALDWIN.

REFERENCES CITED

The following references are of record in the file of this patent:

UNITED STATES PATENTS

| Number | Name | Date |
|---|---|---|
| 716,668 | Cheney | Dec. 23, 1902 |
| 1,807,407 | Hohnhorst | May 26, 1931 |
| 2,159,302 | Rab et al. | May 23, 1939 |